(12) United States Patent
Cooper

(10) Patent No.: US 10,931,820 B1
(45) Date of Patent: *Feb. 23, 2021

(54) INTELLIGENT INTERACTIVE VOICE RESPONSE SYSTEM FOR PROCESSING CUSTOMER COMMUNICATIONS

(71) Applicant: West Corporation, Omaha, NE (US)

(72) Inventor: Brian W. Cooper, Omaha, NE (US)

(73) Assignee: West Corporation, Omaha, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/430,613

(22) Filed: Jun. 4, 2019

Related U.S. Application Data

(63) Continuation of application No. 15/157,145, filed on May 17, 2016, now Pat. No. 10,313,519, which is a
(Continued)

(51) Int. Cl.
*H04M 3/51* (2006.01)
*H04M 3/493* (2006.01)
*G06Q 30/02* (2012.01)
*G06Q 20/40* (2012.01)
*G06F 16/2457* (2019.01)
(Continued)

(52) U.S. Cl.
CPC .... *H04M 3/5166* (2013.01); *G06F 16/24575* (2019.01); *G06Q 20/405* (2013.01); *G06Q 20/4014* (2013.01); *G06Q 30/016* (2013.01); *G06Q 30/0277* (2013.01);
(Continued)

(58) Field of Classification Search
CPC .......... G06F 16/24575; G06F 16/9535; G06Q 20/4014; G06Q 20/405; G06Q 30/016; G06Q 30/0277; G06Q 50/01; G06Q 50/26; G06Q 30/06; G06Q 20/322; G06Q 40/12; H04L 29/06; H04L 63/0884; H04L 63/1466; H04L 63/08; H04L 63/1483; H04M 1/64; H04M 3/2218; H04M 3/493; H04M 3/51; H04M 3/5166; H04M 3/5183; H04M 7/00; H04M 11/00
USPC ..... 379/88.01, 88.22, 93.03, 201.01, 266.01, 379/88.16; 382/177; 704/275; 705/1.1,
(Continued)

(56) References Cited

U.S. PATENT DOCUMENTS 6,385,592 B1 * 5/2002 Angles .................. G06Q 30/02
705/14.56
7,567,940 B1 * 7/2009 Engelberg .............. G06Q 20/10
705/50
(Continued)

*Primary Examiner* — Gerald Gauthier

(57) ABSTRACT

A method and apparatus of processing multiple user call records via an IVR call processing application is disclosed. One example method may include receiving a call from a user device, obtaining first user information from a user account stored in a user databank. The first information may be associated with a first call record established during a first previously received call from the user device. The method may also include establishing a first confidence level based on the first user information and obtaining second user information from the user account stored in the user databank. The second user information may be associated with a second call record established during a second previously received call from the user device. The method may also include establishing a second confidence level based on the second user information and transmitting an offer to the user device based on the first confidence level and second confidence level.

17 Claims, 9 Drawing Sheets

Related U.S. Application Data continuation of application No. 14/727,172, filed on Jun. 1, 2015, now Pat. No. 9,344,567, which is a continuation of application No. 13/596,333, filed on Aug. 28, 2012, now Pat. No. 9,049,295.

(51) Int. Cl.
  *G06Q 50/00* (2012.01)
  *H04M 3/22* (2006.01)
  *G06Q 30/00* (2012.01)

(52) U.S. Cl.
  CPC .......... *G06Q 50/01* (2013.01); *H04M 3/2218* (2013.01); *H04M 3/493* (2013.01); *H04M 3/5183* (2013.01)

(58) Field of Classification Search
  USPC ..... 705/7.39, 16, 35, 42, 62, 64, 65, 67, 44, 705/14.56; 726/7, 26, 28
  See application file for complete search history.

(56) References Cited

U.S. PATENT DOCUMENTS

| | | | | |
|---|---|---|---|---|
| 8,200,527 B1* | 6/2012 | Thompson | ......... | G06Q 10/0639 705/7.39 |
| 8,600,019 B1* | 12/2013 | Cooper | ............... | H04M 3/4936 379/118 |
| 8,762,276 B2* | 6/2014 | Lepisto | ............ | G06Q 20/40145 705/44 |
| 8,831,203 B2* | 9/2014 | Chang | ................ | H04M 3/5175 379/221.04 |
| 8,832,857 B2* | 9/2014 | Court | ................. | H04L 63/0815 726/1 |
| 9,049,295 B1* | 6/2015 | Cooper | ................ | H04M 3/493 |
| 9,246,907 B2* | 1/2016 | Canning | ............ | H04L 63/0815 |
| 9,424,612 B1* | 8/2016 | Bright | .................... | G06Q 50/01 |
| 9,609,102 B1* | 3/2017 | Cooper | ............ | H04M 3/42068 |
| 9,818,093 B1* | 11/2017 | Grier | .................... | G06Q 20/322 |
| 9,948,629 B2* | 4/2018 | Eisen | .................. | H04L 63/0807 |
| 2003/0171930 A1* | 9/2003 | Junqua | .................... | G10L 17/00 704/275 |
| 2004/0028200 A1* | 2/2004 | Carlson | ................. | H04M 3/382 379/201.01 |
| 2004/0078340 A1* | 4/2004 | Evans | .................... | G06Q 20/10 705/64 |
| 2005/0097046 A1* | 5/2005 | Singfield | ............ | G06Q 20/1085 705/42 |
| 2005/0125360 A1* | 6/2005 | Tidwell | ................ | G06Q 20/042 705/65 |
| 2005/0169441 A1* | 8/2005 | Yacoub | ............... | H04M 3/4936 379/88.16 |
| 2007/0169182 A1* | 7/2007 | Wolfond | ................. | G06F 21/31 726/7 |
| 2007/0198435 A1* | 8/2007 | Siegal | ..................... | G06F 21/32 705/67 |
| 2008/0084975 A1* | 4/2008 | Schwartz | .............. | H04M 3/436 379/88.22 |
| 2008/0215346 A1* | 9/2008 | O'Cinneide | ............ | G06F 21/31 705/1.1 |
| 2008/0275748 A1* | 11/2008 | John | ...................... | G06Q 20/40 705/35 |
| 2009/0006230 A1* | 1/2009 | Lyda | ...................... | G06Q 40/00 705/35 |
| 2009/0116636 A1* | 5/2009 | Pickering | ............ | H04M 3/5183 379/266.01 |
| 2011/0268360 A1* | 11/2011 | Antonijevic | ........... | G06K 9/344 382/177 |
| 2012/0078735 A1* | 3/2012 | Bauer | .................... | G06Q 20/20 705/16 |
| 2013/0117832 A1* | 5/2013 | Gandhi | ................. | H04L 9/3271 726/7 |
| 2013/0156165 A1* | 6/2013 | Springer | ............... | H04M 3/493 379/88.01 |
| 2013/0305378 A1* | 11/2013 | Johnson | ................. | G06Q 20/02 726/26 |
| 2017/0006042 A1* | 1/2017 | Hardt | .................... | H04L 63/105 |
| 2018/0232837 A1* | 8/2018 | Dill | ........................ | G06Q 30/06 |

\* cited by examiner

INTELLIGENT INTERACTIVE VOICE RESPONSE SYSTEM FOR PROCESSING CUSTOMER COMMUNICATIONS

CROSS-REFERENCE TO RELATED APPLICATIONS

This application is a continuation from U.S. patent application Ser. No. 15/157,145, filed May 17, 2016, entitled "INTELLIGENT INTERACTIVE VOICE RESPONSE SYSTEM FOR PROCESSING CUSTOMER COMMUNICATIONS", which is a continuation from U.S. patent application Ser. No. 14/727,172, filed Jun. 1, 2015, entitled "INTELLIGENT INTERACTIVE VOICE RESPONSE SYSTEM FOR PROCESSING CUSTOMER COMMUNICATIONS", now issued U.S. Pat. No. 9,344,567, which is a continuation from U.S. patent application Ser. No. 13/596,333, filed Aug. 28, 2012, entitled "INTELLIGENT INTERACTIVE VOICE RESPONSE SYSTEM FOR PROCESSING CUSTOMER COMMUNICATIONS", now issued U.S. Pat. No. 9,049,295, each of which is incorporated by reference herein in its entirety.

TECHNICAL FIELD OF THE INVENTION

This invention relates to a method and apparatus of processing user communications in an interactive voice response (IVR) system, and more particularly, to processing a communication session with a customer based on known data about the customer.

BACKGROUND OF THE INVENTION

Conventionally, automated call processing systems may have limited access to customer information and call related purposes, and may not have account access to customer information sources. As a result, automated and interactive voice response call processing platforms fail to provide the personal and customized call processing efficiency demanded by callers and related consumers today.

SUMMARY OF THE INVENTION

One embodiment of the present invention may include a method of processing multiple user call records via an intelligent voice response (IVR) call processing application. The method may include receiving a call from a user device and obtaining first user information from a user account stored in a user databank. The first information is associated with a first call record established during a first previously received call from the user device. The method may also include establishing a first confidence level based on the first user information and obtaining second user information from the user account stored in the user databank. The second user information is associated with a second call record established during a second previously received call from the user device. The method may also include establishing a second confidence level based on the second user information, and transmitting an offer to the user device based on the first confidence level and the second confidence level.

Another example embodiment of the present invention may include an apparatus configured to process multiple user call records via an intelligent voice response (IVR) call processing application. The apparatus may include a receiver configured to receive a call from a user device, and a processor configured to obtain first user information from a user account stored in a user databank, the first information being associated with a first call record established during a first previously received call from the user device, establish a first confidence level based on the first user information, obtain second user information from the user account stored in the user databank, the second user information being associated with a second call record established during a second previously received call from the user device, and establish a second confidence level based on the second user information. The apparatus may also include a transmitter configured to transmit an offer to the user device based on the first confidence level and the second confidence level.

DETAILED DESCRIPTION OF THE INVENTION

Figure 1:
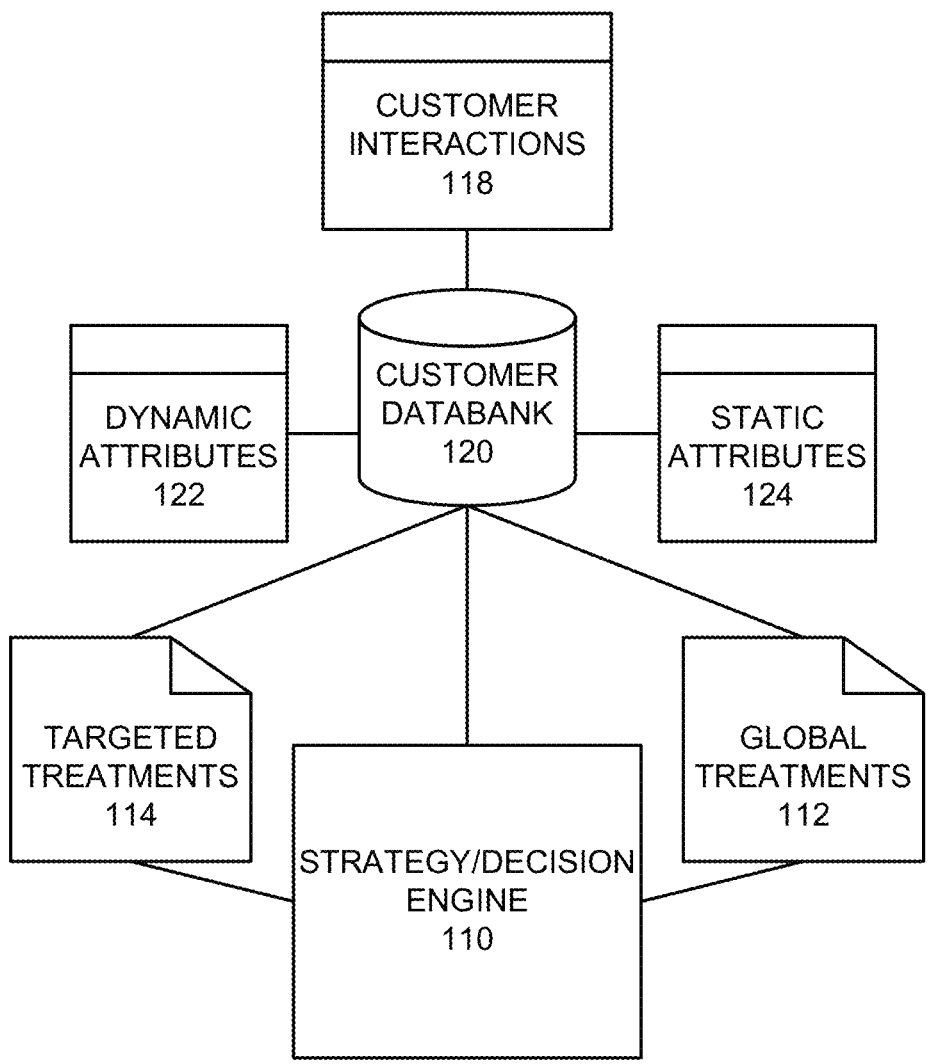
FIG. 1 illustrates logic diagram illustrating a client call process according to example embodiments.

It will be readily understood that the components of the present invention, as generally described and illustrated in the figures herein, may be arranged and designed in a wide variety of different configurations. Thus, the following detailed description of the embodiments of a method, apparatus, and system, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present invention. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present invention, the invention may be applied to many types of network data, such as packet, frame, datagram, etc. For purposes of this invention, the term "message" also includes packet, frame, datagram, and any equivalents thereof. Furthermore, while certain types of messages and signaling are depicted in exemplary embodiments of the invention, the invention is not limited to a certain type of message, and the invention is not limited to a certain type of signaling.

Example embodiments of the present invention provide the ability to understand an individual customer and can provide a faster call resolution by applying any known intelligence to the call handling of the actual call conducted between a user/customer/caller and a call processing platform system. This call processing system may operate by retrieving known data about a customer from previous call transactions or from other transactions, such as an agent interaction/web interaction, etc., or from external sources such as a client customer relationship management (CRM) interface and apply that knowledge to the business logic. For example, if a known caller has an outstanding bill due the same day or the day after the call is received, then a first call operating option would be to retrieve a bill paying message or procedure and instruct the user to first pay his or her bill. This ensures the call processing system is providing its capabilities to those customers who are willing to pay their bills or talk to a customer representative about their current bill prior to engaging in any other activity offered by the call processing system.

Intelligent interactive voice response (IVR) systems may optimize existing call center solutions by maximizing call resolution speed for the callers/customers and increase IVR engagement rates. For example, more customers are likely to leverage and adopt IVR automation if they believe it will help their outstanding issue(s) become resolved as quickly as possible. Other features of intelligent IVR may include optimizing agent effectiveness and efficiency by sending a satisfied customer to the right agent for call resolution. Such a system may also increase agent satisfaction and can reduce overall costs per call including both agent and IVR service costs.

An intelligent IVR voice self-service system may optimize the value of the most utilized and mature customer contact channel, such as a voice channel, and provide the maximum level of personalization for the caller. The intelligent IVR system may also be applicable for both inbound and outbound call scenarios. The intelligent IVR system according to example embodiments may leverage: user defined preferences (i.e., those set via a solution such as a "Preference Center"), customer interaction data to augment the user defined preferences with those preferences learned over time by tracking customer usage patterns, client and/or client designated $3^{rd}$ party data to provide additional insights into customer value, segmentation, geo-demographics, billing/collections status, etc. Other features of the intelligent IVR system may include leveraging external data sources to determine special treatment of a caller, such as a time of day, day of week, weather conditions, etc. Additional features may include the ability to leverage multi-channel customer interaction data, if and when this multi-channel data becomes available from the client and/or a client designated $3^{rd}$ party.

The intelligent IVR system may continually attempt to predict caller intent for each phone channel interaction, once the caller has been identified and authenticated in certain scenarios where health insurance portability and accountability act (HIPPA) information, payment card industry (PCI) information and personally identifiable information (PII) are provided by a caller as part of the self-service interaction during a call. The intelligent IVR system may be intelligent enough to use each customer interaction to learn more about that customer and use those related call interaction(s) to continue learning more effectively and efficiently for present and future interactions with that particular caller. The intelligent IVR system of the present application may leverage the learning operations over time to provide the most relevant customer treatment for the customer/caller each and every time they call. The intelligent IVR system also has the logging and reporting capabilities to permit continuous learning and dynamic call handling procedures and tuning of an intelligence engine over time.

FIG. 1 illustrates an example logic diagram illustrating a client call process 100 according to example embodiments. Referring to FIG. 1, a strategy/decision engine 110 provides a data processing engine configured to provide clients with the capability to set pre-determined customer treatments based on customer attributes and other customer data retrieved and stored in memory. According to one example, there may be multiple different "layers" of treatment for individual customers. There should be treatments that are applied to all callers ("global treatments" 112) and treatments that may be applied only to certain types of callers ("targeted treatments" 114).

An example of a global treatment 112 may include a financial banking use case scenario. For instance, a global treatment 112 may be enabled by providing a special greeting to any caller that calls within the first 30 days from when they opened a new bank account. In this example, the special greeting may be a pre-recorded message that is stored in a database and is applied to a global variable "allusers", and which is further limited by a predefined time frame, such as "30 days", and further limited by another limiting factor "new bank accounts." Any user who calls the intelligent IVR call center and satisfies each of the various criteria noted above will hear the recording welcoming them to their new bank account and offering additional options for new customers. Customer data, behavioral patterns and other customer specific data may be obtained during a call or from a previous call or registration effort and stored in the customer databank 120. The customer data may be retrieved and used for processing by the strategy engine 110.

According to another example embodiment, an intelligent messaging or SMS messaging customer interaction system may be implemented. For example, FIG. 1 illustrates a customer interaction(s) record 118 that represents records and/or transactions which are continually performed in an attempt to predict customer intent for each SMS message interaction session. The customer may be identified and authenticated in certain scenarios where health insurance portability and accountability act (HIPPA) information, payment card industry (PCI) information and/or personally identifiable information (PII) are provided by the customer SMS message as part of the self-service interaction during a SMS message session. The intelligent IVR system may be intelligent enough to use each SMS message interaction to learn more about that customer and use those related SMS session interaction(s) to continue learning more effectively and efficiently for present and future interactions with that particular caller. The intelligent SMS system of the present application may leverage the learning operations over time to provide the most relevant customer treatment for the customer/caller/message-sender each and every time they transmit a SMS message (i.e, message style, responsiveness, time elapsed between messages, information willing to be shared, etc.). The intelligent SMS message system also has the logging and reporting capabilities to permit continuous learning and dynamic SMS message handling procedures and tuning of an intelligence engine over time.

According to another example, targeted treatments may be used to communicate with a smaller or more focused group of customers. For example, each line of business within the bank (i.e., retail/consumer banking, wealth management, business lending, mortgage, etc.) may have a specific target group of customers as inferred from their account balance, history, call behavior, etc. An example of a targeted treatment 114 may be a special low interest rate offer that is being made to those callers who have over a specific amount of money in their primary checking account and have a credit card with the bank. During a call with a customer, if an offer is offered and accepted, there may be certain routing treatments to then process that call to a special skill group to "close the deal."

Examples of call routing treatments performed by the strategy/decision engine 110 may include static attributes 124 which do not change, and dynamic attributes 122 which can be quickly and easily changed by the client or call operating center through established configuration settings. An example of a static attribute 124 may include those attributes that are set by the call processing center and/or the client and are not changed on a regular basis (e.g., name, age, occupation, demographic, etc.). Dynamic attributes 122 may change frequently and may be based on changes in the caller's status (e.g., interests, social networking changes (new baby, new house, job title change), current financial goals, etc.). There may be pre-set parameters that trigger certain treatments (i.e., time and/or day parameters for special holiday or open enrollment messaging) or there can simply be a databank of pre-set attributes that permit the client to essentially "check a box" allowing the treatment to be put in place. The client should also be allowed to add and delete attributes as often as they wish.

Examples of dynamic attributes 122 may include a customer value based on dollars spent over a time period, a customer value based on a number of services used, a credit status, a payment status, a customer status, such as new, existing, inactive, services utilized by a customer (cable subscriber that only has basic service versus a customer that has many premium channels), a frequency of customer contacts (repeat caller vs. first time caller). Dynamic attributes are customer attributes that are likely to change in the near-term.

Examples of static attributes 124 may include income level, male/female, homeowner vs. renter, residence, marital status, number of children, age of children, age of customer, name, and credit score. Static attributes are customer attributes that are not likely to change but may change over extended periods of time.

Examples of targeted treatments 114 may include sending a call to a collections agent for payment delinquent customers, sending a call to a payment module for payment due customers, sending new customers to an account set up agent, sending high value customers to a premier agent, sending lower value customers to an automated self-service option menu, sending customers with an open claim to a claims agent and offering customer deals on services not utilized (e.g., basic cable subscriber gets an offer for a 30-day free trial for a premium channel). Examples of global treatments 112 may provide notifying all customers about a new service (pay-per-view available on mobile devices), notifying all customers about new features (one click ordering on the web for pay-per-view), notifying all customers about policy changes (claims are paid in 25 days versus 20 days).

The strategy engine 110 should be easily integrated with other call processing systems, client applications, and/or $3^{rd}$ party data sources to allow for multiple parameter treatments based on the data received from caller interactions. Examples of such a system could be a preference management system (i.e. "preference center"), such as a client's existing CRM or knowledgebase platform, a client's order management system, or an external system, such as a mortgage service or a travel agency service. A web-based user interface is made available to the client, providing the capability to execute all the call processing features noted above. Also, reporting is available to track user access and all changes within the strategy engine 110.

A confidence scoring operation may be used for personalization and authorization. This confidence scoring may provide an optimized customer experience from a personalization perspective by allowing the communication call center to greet callers by name or at least acknowledge some information that is client specific to avoid the less preferred "big brother" scenario (i.e. "Thanks for being a valued 'Gold Elite' member, how can I help you . . . "). According to example embodiments confidence scoring may allow for varying degrees of personalization. For example, the confidence scoring may be related to who the customer is at the time of a call. Varying degrees of confidence scoring may be used to make certain caller specific determinations about the caller.

Figure 2:
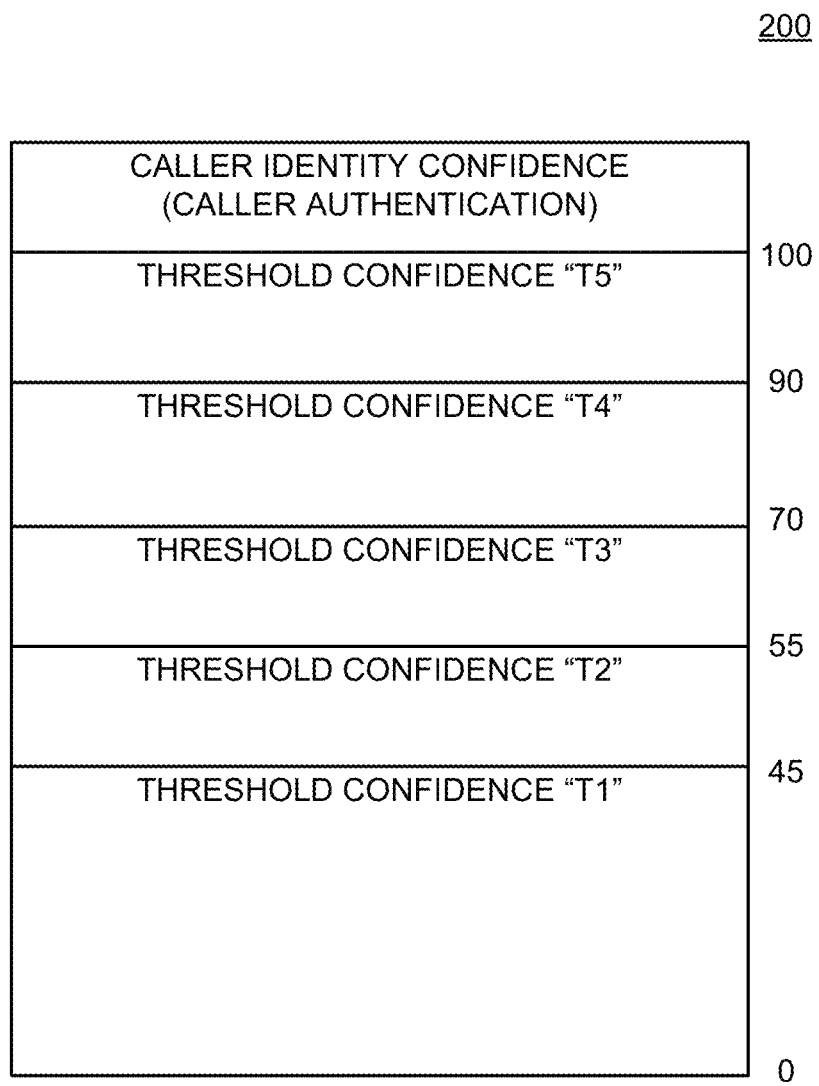
FIG. 2 illustrates an example caller identity confidence scoring chart according to example embodiments.

FIG. 2 illustrates an example caller authentication and caller confidence model 200. Referring to FIG. 2, a new customer transaction may be established upon receiving certain customer information at the customer databank. Basic customer information, such as name, address, account type may provide a basic level of call authentication, such as confidence level 45 out of 100 or a threshold level "T1." A next confidence level "T2" or 55 may be reached after a customer's information is matched against a customer databank and/or a caller accepts a greeting provided by the call processing system. Next, a caller may confirm his or her identity by providing feedback verbally or via dual tone multi-frequency (DTMF) selections on the phone. For example, a caller may be required to speak and his or her voice may be recorded and used as a voice sample to match a previous sample stored in the customer databank from a previous call. At this point, the caller confidence level may have elevated past "T3" or a 70 on the 100 point scale. The customer may then confirm his or her identity and receive an authorization which indicates a confidence level beyond "T4" or 90 to access an existing account or conduct certain transactions (e.g., banking, account changes, etc.). The predetermined threshold levels may be paired with various different types of customer transactions. For example, a confidence level of 90 may be required to perform banking over the phone while a confidence level of 55 may be required to upgrade a cable television service of the phone.

According to one example embodiment, a banking/financial services use case may provide a caller or customer with varying levels of account access depending upon the measured caller identity confidence level. For example, for a low personalization confidence example ("T2" or below), a customer may have just opened a new checking account and is calling into a banking call center for the first time to check his or her balance. The call processing application of the call center system may use automatic number identification (ANI) to display or capture the telephone number of a calling party to determine whether an ANI match operation can be used to identify a caller. If the ANI match procedure fails to match the caller's ANI to a known caller stored in the customer databank then a call treatment procedure performed by the call processing application would yield a generic greeting without any customer specific feedback. The customer would be authenticated and their information would be collected and registered for a next call scenario with little or no customization for the current call session. For example, a current customer interest for banking may include "loan", "mortgage", "pay bill", "CDs." A customer interest for a cable service provider may include "movie channels", "pay-per-view", "upgrade service", "downgrade service", "customer service representative", "service failure/outage", etc.

According to another example, a medium personalization confidence example ("T3" to "T4") may provide an example where a same customer calls back the same call processing center a month later to inquire about a loan. The call processing application may perform an ANI match procedure by using the current ANI numbers of the caller to perform a match with a previous call record stored in the customer databank (i.e., a previous call to obtain an account balance). However, in this example the present call may be the second call received into the call processing application. As a result, the call processing application may perform the ANI match, retrieve the previous call record and determine if any outstanding issues remain (i.e., questions posed by the caller, account specific matters that have not yet been resolved, unresolved issues pending in the user account). The resulting call treatment may provide performing an authentication of the caller based on the ANI prior to the greeting and informing the caller of the matched information (i.e., "I've checked out records and found a match for your account. Is this 'John Smith'?").

According to another example, a high personalization confidence example ("T4" and above) may provide an example where the same customer/caller has had an outstanding account with a bank for several months and has a savings and/or checking account and has created a personal loan application. The customer may be calling the call processing center of the bank to make a payment on their loan. The call treatment performed by the call processing application may provide authenticating the caller with the ANI of the caller's device prior to the greeting. Once it is determined that the customer is calling from the same ANI as usual (i.e., based on previous call sessions logged in the caller databank) the confidence level will be regarded as "high." The call processing application may transmit a greeting to the caller, such as "Welcome back John, are you calling to make a loan payment?", since the call processing application knows that John typically calls in the first week of every month to make his loan payment from previously logged call sessions. Both the name and subject of the message were based on known customer information or customer interests.

Example embodiments may provide an interaction database or databank that is configured to store customer/caller information and provide that information to third party partner databanks (e.g., financial institutions, medical information organizations, retail clients, etc.). Caller information may be obtained from client interactions via call center processing, online registration efforts (i.e., customer pre-registration) and/or social networking sites which are authorized to provide customer information to the customer databank.

Figure 3:
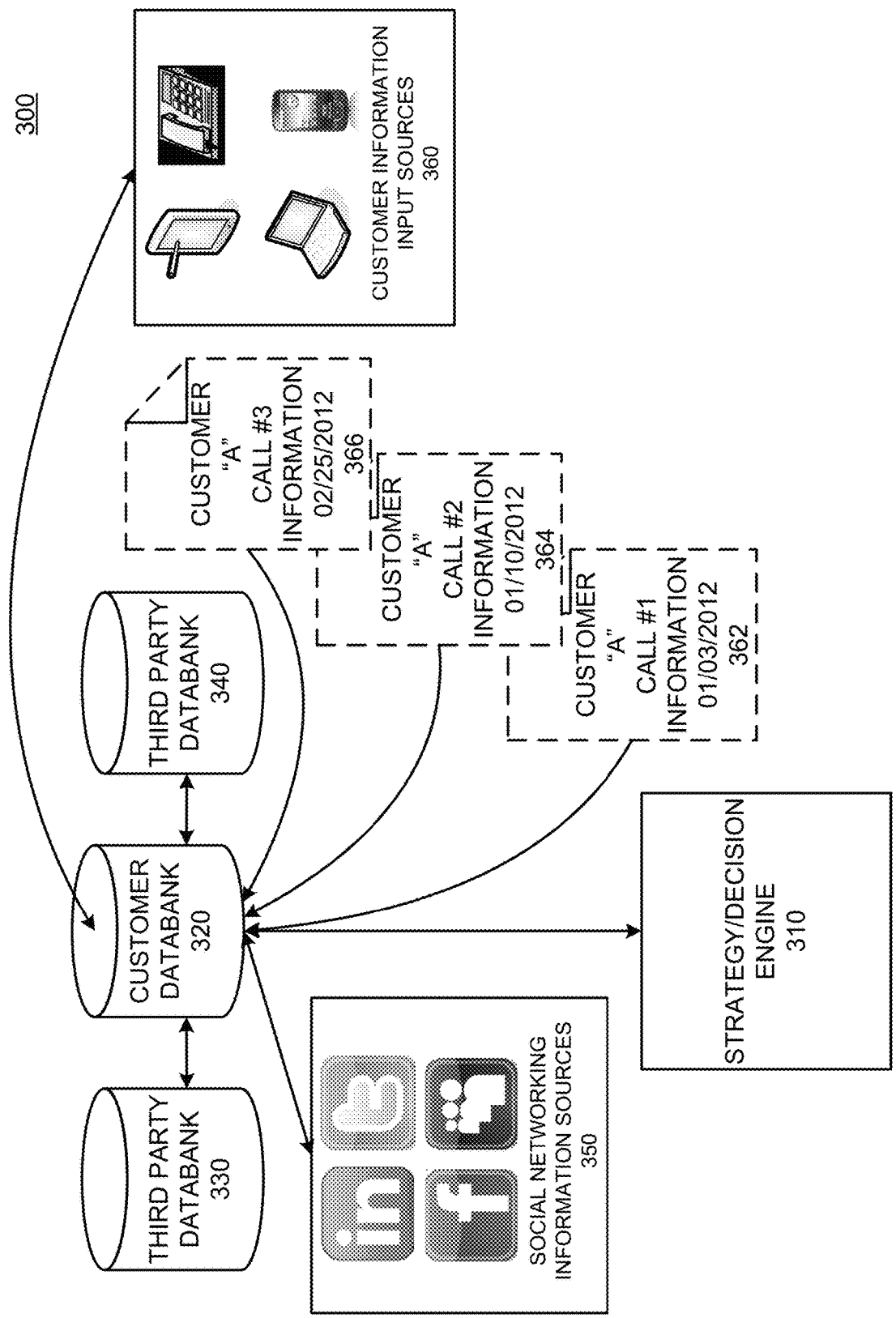
FIG. 3 illustrates a logic diagram illustrating customer information extraction and sharing with third party customer databanks according to example embodiments.

FIG. 3 illustrates a logic diagram illustrating customer information extraction and information sharing with third party customer databanks according to example embodiments. Referring to FIG. 3, the databank 320 may be integrated to leverage internal and/or external data to establish a learning mode of operation upon initial deployment. This "foundational data" may be loaded before taking a first call and may include data from a client's customer relationship management (CRM), order management system (OMS), loyalty database, etc. In addition customer information may be extracted from other existing systems of record that track and log customer interactions.

Referring to FIG. 3, the data would not have to be "loaded" into an interaction database, such as the customer databank, but could also simply be accessed by a call processing application as needed. The call processing application may retrieve customer records and information and share that information with other remote third party databanks 330 and 340. For instance, a data backup operation may trigger the customer databank 320 to provide a copy of the customer records to the third party databanks 330 and 340 on a regular basis (i.e., one a day, once a week, etc.) so those systems may update their records for marketing purposes. Third party databanks 330 and 340 may be marketing companies or customer service companies partnered with the primary call processing center having access to the customer's information. These third party databanks 330 may require access to updated customer information for future transactions.

According to one example, a customer may call a call processing center or system via any of a variety of different customer information input sources 360 (e.g., a telephone, a mobile phone or smartphone, a laptop computer and/or a tablet computing device). The user device may be a computer, laptop, mobile, wireless or cellular phone, a PDA, a tablet, a client a server or any device that contains a processor and/or memory, whether that processor or memory performs a function related to an embodiment of the invention. A first call 362 may be placed to the call processing center by a first caller to provide certain information that will be stored in the customer databank 320. Additional calls 364 and 366 may be placed at a later time and may offer additional caller information that may be accepted and stored to increase the amount of customer information available for subsequent calls and third party databanks.

Each time a call is received, the strategy/decision engine 310 may extract user provided information (e.g., personal information, preference information, etc., and store the caller information in the customer databank 320. A user's profile may be established from the initial call or caller communication. The profile may be updated each time the user places new calls, or automatically by accessing user profile information from third party social networking information sources 350. For example, by allowing the call processing system to contact the social networking information sources 350 (e.g., LinkedIn®, Twitter®, Facebook®, MySpace®, etc.), user information may be dynamically updated by periodically accessing those user feeds or user accounts and retrieving the new or changed information and incorporating that new customer information with the existing customer profile information stored in the customer databank 320.

Example operations of the call processing system may provide preference management (user defined preferences) data as a part of the information stored in the customer databank 320, or as a supplementary data source, which may be used to perform intent prediction during a subsequent call (e.g., "Hello Mr. Smith, are you calling to make another payment on your existing loan"). Additional operations of the call processing system may provide logging customer interactions first in the voice channel for both live agent and interactive voice response (IVR) data. Both the live agent data and the automated IVR data obtained from a caller session should be considered together for a full perspective of voice interactions. Also, logging, tracking and/or information importing may be performed to obtain customer interaction data from other channels such as web, mobile, and social media websites. The call center may utilize a current voice channel as a source for caller information, and then "grow into" multi-channel context awareness as the data from those other channels is made available to the customer databank.

A received call may accurately identify a caller in a multi-channel environment, The customer databank 320 allows for multiple "customer keys." When an unrecognized ANI is associated with a current customer that is already identified by the databank 320, then the call processing system should ask the caller if they want to add the new identified ANI number to their existing profile as an alternative trusted call number source.

Authenticating a caller may include accurately identifying the caller ("user", in a multi-channel environment). The customer databank 320 may allow for multiple "customer keys" for increased efficiency. Callers/users should generally not have to experience a full authentication process each time a call is placed to establish communication with a call processing application. Once a caller is fully authenticated the first time, a corresponding ANI, voice sample, etc., may be obtained, stored and used to match with an existing account, and assuming the corresponding confidence level is high enough (i.e., past interactions indicated that John Smith is the one calling from the known ANI in every case), authentication may be performed based on the ANI alone. This type of authentication may apply to a simple order status application where no HIPAA and/or PII/PCI type information is currently available. Additional security measures may provide adding another simple prompt for obtaining a personal identification number (PIN) or a last four numerical digits of a SSN. Voice recognition may also be used to compare a voice sample from a previous call with a current call for added authentication.

According to example embodiments, multiple authentication strategies may be employed to address the various security concerns experienced today by call processing systems. For example, authentication concerns may include multiple users calling from the same ANI (either two different customers using the same phone or different customers calling from behind a PBX in an office, etc.), multiple accounts calling from the same ANI, multiple nationalities (language requirements) calling from the same ANI/household, and the ANI is not delivered for all calls (need to prompt for second authentication information element such as PIN, etc.). Multiple accounts per household (multiple-tenants with multiple different digital television (DTV) accounts) may also create problems with the ANI call processing system.

Figure 4:
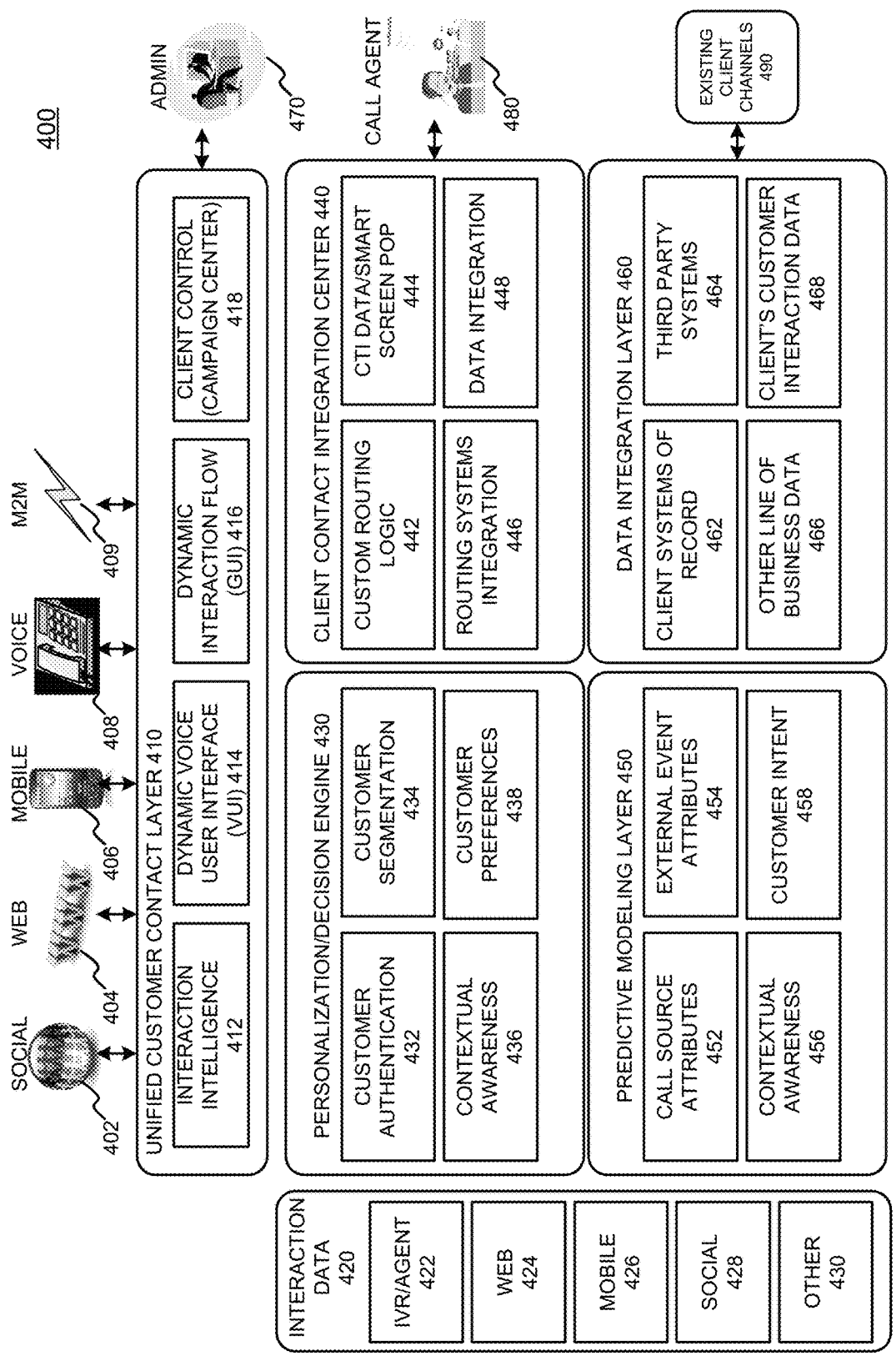
FIG. 4 illustrates a logic diagram illustrating an intelligent interactive voice response system according to example embodiments.

FIG. 4 illustrates an example logic diagram of the call processing system according to example embodiments. Referring to FIG. 4, a unified customer contact layer 402 may be used to communicate with a caller or customer via any one or more of a social networking information source 402, a web-based communication platform 404, a mobile device 406, a voice telephone 408 and a machine-to-machine (M2M) platform 409. An interaction intelligence 412 and dynamic voice user interface may provide a way to communicate with the caller and a dynamic interaction flow 416 and a client control campaign center 419 may offer additional call managing operations managed by a administrator 470.

Obtaining interaction data 420 about a caller may include obtaining information from various information sources, such as an IVR/agent 422, a web source 424, a mobile device 426, a social networking information source 428 and/or any other information source 430 that offers caller information. The caller information may be received and organized according to a predefined caller information template record stored in the caller information databank. Various engines may be used to process caller authentication information, integrate a call with other information sources and routing options, perform predictive modeling about a caller's intent and purpose and perform data integration with third party client systems and other communication entities.

A personalization/decision engine 430 may perform customer authentication 432 to authenticate a caller prior to allowing the customer to perform certain operations, customer segmentation 434 to make a determination where to route a received call, contextual awareness 436 to identify contextual information for continued call processing, and incorporate customer preferences 438 to provide customer options to the caller based on known preferences.

A client contact integration center 440 may be used to perform custom routing logic 442 to route a caller to the most appropriate agent or IVR menu option. Other features may include a computer telephony integration (CTI) data and smart screen pop option to connect with a live agent 480, and a routing systems integration 446 and data integration 448 module to use caller information to determine where to route the caller.

An intent prediction/predictive modeling layer 450 may employ a predictive modeling algorithm that utilizes call source attributes 452, external event attributes 454, contextual awareness 456 of the caller behavior and customer intent information 458 obtained during a live call to permit the intelligent IVR call processing system to offer the user the "next best treatment" (action) based on what is known about the customer at the time of the current caller interaction. The intent predictive modeling engine 450 may rely on determined confidence levels associated to enable a smart sell procedure ("right offer, right person, right time"). A customer may have an established record of calls indicating interests in loans, interest rates, etc. The caller may have a set minimum balance in his or her account(s) triggering the prerequisite for a particular offer. The caller may have called into the call processing center indicating a new opportunity to offer the customer a new offer not yet offered. The caller may be bypassing options to pay bills or perform other operations in search of something different. The predictive modeling algorithm employed by the modeling layer 450 may recognize the various circumstances as an opportunity to offer this caller a particular "offer" that is based on a unique, user specific call treatment (e.g., "new loan rates posted this month, act now!"). Such a predictive model may also be used to offer a product upsell or cross-sell to the caller.

Intent prediction through the predictive modeling layer 450 provides the ability to leverage all available data from the strategy/decision engine 110/310 including static and dynamic business rules, customer interaction data beginning with a single channel and then growing into multi-channels, including all non-voice channel data such as client web logs, social media logs, mobile application logs, etc. Additional client information sources may include client systems of record, 3rd party systems of record, user defined preferences (i.e. "preference management" via "customer preferences" 438), learned user preferences via interaction with the customer databank data and tracked over time based on a caller's/customer's usage patterns.

In further detail, the interaction intelligence module 412 may modify a customer treatment based on the known and learned customer attributes. The dynamic voice user interface/intelligence 414 may modify how the system interacts with the customer based on the known and learned customer attributes. The dynamic interaction flow 416 may modify how the business rules apply with the customer interaction based on the known and learned customer attributes. The client control (campaign center) 418 may allow a client to set parameters for managing customer interactions through a user interface, the customer authentication module 432 may define the requirements for multilayer authentication. The customer segmentation module 434 may be based on a customer value (e.g., high, medium, low, etc.), a customer status (e.g., new, existing, inactive) and/or other demographics. The contextual awareness module 436 may provide an understanding as to which channel the customer is operating (e.g., voice, mobile, web, etc.). The customer preferences 438 may allow the customer the option to set a preference through a user interface (e.g., email me the coupon of the week, send me a text when my prescription is ready, etc.).

Continuing with the modules of FIG. 4, a custom routing logic 442 may apply customer routing rules based on business parameters and intelligence about the customer, a CTI data/smart screen pop 44 may send all known information to an agent desktop. The routing system integration module 446 may integrate the application intelligence with the call routing engine. The data integration module 448 may integrate data from multiple sources into a decision engine. The call source attributes 452 may gain intelligence from prior customer interactions (e.g., a customer called last time to order pay per view). The external event attributes 454 may gain intelligence from external factors that impact customer behavior (e.g., Weather caused a power outage). The contextual awareness module 456 may gain intelligence about how the customer is communicating with a business (e.g., mobile, web, voice, etc.). The customer intent module may apply algorithms to predict the intent of the caller based on known and learned attributes. The client systems of record 462 may integrate into a client system to gain additional knowledge about the customer. The third party systems 464 may integrate into $3^{rd}$ party systems, such as a credit score, or a reverse lookup to gain intelligence about the customer. The other line of business data 466 may be used to integrate other business data as applicable to gain intelligence about a customer. A client's customer interaction data 468 may be used to integrate into a client system (CRM) to gain additional knowledge about the customer.

When establishing the customer interaction databank/database 120/320, there must be consideration for all relevant data elements/integration points. The data structure may be customized for each different client utilizing the call processing center model via a call processing platform or related call processing application. Examples of the different caller/customer attributes and associated data from the caller information databank 120/320 that could be used to leverage call processing procedures are described below. In the following information examples, a bank may pair or match certain information to authorize certain transactions. The bank may be an example client utilizing the caller interaction information from the caller information databank. Examples of such information pairing may include consumer account type(s)—i.e. checking, may be paired with ANI(s) and customer account(s) both active and closed.

Business account types(s)—i.e., checking may be paired with a dialed number information service (DNIS(s)) to provide the time since the account(s) opened assuming it is known what the date is that the accounts opened/closed. The account number(s)—(authentication) may be paired with IVR application selections of the caller to provide the time since the account(s) was closed. The last 4 digits of a SSN (Authentication) may be paired with an IVR application/user authentication to provide a time elapsed since an account opened/closed. A customer password (web user account) may be paired with an IVR interaction date to provide a last transaction made by an account (by channel). An on-line account status—i.e., locked may be paired with an IVR interaction time(s) to determine customer preferences per interaction history).

A transaction history, by account type, may be paired with transfer points/opt-outs within IVR customer preferences (set by customer). A transaction interface—i.e. ATM, Branch, etc. may be paired with a transfer destination (number dialed) to establish a customer treatment based on a client's business rules. A transaction type—i.e. withdrawal, deposit, etc. may be paired with an IVR interaction times, per customer to establish a proactive offer made/accepted to a user. A transaction date may be paired with IVR interaction dates, per customer, to establish a customer segment if available. A transaction descriptor details (if available) may be paired with a proactive offer made/accepted to establish a language selected by the customer for the past 2 or more interactions.

Examples of other data types of information that are extracted from the customer information database (i.e., interactive database) and used by the client to make pairings, authenticate user behavior and predict outcomes may include: a contact number associated with a transaction (if available), an account balance, by account type, a debit/credit card activation date(s), products a customer has, by account, products available, by account (upsell/cross-sell), price, by product (one-time and/or recurring), account holder information, home phone number, business phone number, home address, business address, billing address (if different), wireless phone number, personal e-mail address, business e-mail address, customer segment(s) as defined by business, call routing business ruler, transfer number(s), web log information (multi-channel), and other lines of business (i.e., treasury, cash vault, etc.).

According to example embodiments the strategy decision engine 110/310 may utilize static attributes for interaction intelligence based on pre-set business rules and attributes. This allows a foundation to be set for the client (e.g., bank, customer service firm, service provider, etc.) that makes their business rules quickly and easily configurable and manageable. The engine deployed in this phase should be able to accommodate other data elements as part of the pre-set attributes such as time and day parameters, user-defined preferences (i.e., parameters set via a preference center or a similar tool deployed by the client or designated $3^{rd}$ party), and client data from their systems of record (i.e., CRM, KB, OMS, etc.). In addition to the intelligence that the strategy engine provides, this call processing system configuration also supports some degree of personalization in terms of both greeting callers by name (once authenticated), or if the client prefers not to be greeted by name, then simply providing a more targeted treatment to that particular customer.

According to other example embodiments the strategy decision engine 110/310 may utilize static attributes to build on the static attributes. For example, the client may introduce a set of dynamic attributes that can be added, changed, or deleted through the web based UI. This allows them to load a "library" of customer treatments via the UI and turn them on and off with on-the-fly with configuration changes. The "dynamic" attributes provide the flexibility to change customer treatments as their business and/or products and services change over time. The dynamic attributes also provide the foundation for the "intent prediction" model. In another example, the intelligent IVR may build on the foundation set from the static and dynamic attributes and add the predictive modeling element that allows the IVR application to become smarter about what customers prefer and intend to interact with over time.

In yet another example embodiment, a full deployment may include multi-channel contextual awareness. This example utilizes all elements and layers of user attributes and related information from multi-channel interactions, allowing the call processing system to obtain fully visibility of the client's customer across all channels and apply appropriate treatment based on what is known about that particular customer and their recent interactions/preferences. For example, if the customer is logged-on to a website trying to pay their bill and is having problems then they immediately pick up the phone to talk to someone without waiting and the IVR presents them with the bill pay option and attempts to resolve their issue immediately based on what progress they have made already on the website.

According to one example embodiment, a banking use case corresponding to the intelligent IVR system of the present application may provide a new retail customer calling to check her checking account balance and then deciding to transfer $500 from a savings account to a checking account. The interaction and caller account information may provide the interaction database or customer information databank with enough information necessary to trigger a cross-sell offer to the caller. The caller may accept a cross-sell offered by the call processing system to add, for example, overdraft protection to the checking account. The call processing system may recognize the new customer in an initial 30-day period from the time the account was created and a time the caller first called the bank via the call processing system. The caller may demonstrate that she has completed an on-boarding process, for example, by activating a debit card, and if they want to add bill-pay to on-line banking, they can add it right then during the initial call.

The same customer may call back to check a recent transaction performed via a credit card associated with the bank and decide to stop payment on a check. The customer may also desire to find the closest ATM to her home. The call processing system may perform a dual authentication method to ensure at least two authentication measures are performed prior to authorizing such transactions over the phone or online. In response, the call processing system may offer the ATM and branch information via text messaging short message services (SMS) and other communication methods via a multi-channel communication.

The customer may again return to check mortgage rates online and complete a web form that when submitted offers additional user specific information to be stored in the customer information databank 120/320. Later on during a subsequent call, the caller may call to have a user identification ID reset and be offered an IVR-based menu to hear information about a mortgage through the bank and speak with a mortgage representative during the call for the ID reset. Similarly, a small business owner may call the bank to make a payment to an existing line of credit loan and accept a cross-sell for a free financial assessment for wealth management since that business owner has a threshold amount of money in the bank to qualify for such a financial assessment and related treasury services.

In another example, a customer on a website may be shopping for the best certificate of deposit (CD) rates and desire to speak with a representative regarding such rates. The caller may input web form information electronically indicating a desire to speak with a representative and to have the representative call them call them back, text them when available, etc. The IVR call processing system may cross-reference the caller's purpose with a particular agent skill and transfer the call accordingly. In yet another example, a mobile application operating on a caller's smartphone may be operating the bank's present application and offer the caller their bank statement. When the user has question about a particular transaction the user may select an agent option or button and have a call initiated from the smartphone but including the information menu metadata which invokes an agent search function that utilizes the metadata to select the appropriate "account" agent. As a result, the call is answered by the correct agent who greats the caller by name and assists with the known issue without having to guess the context of the user's concern.

Figure 5:
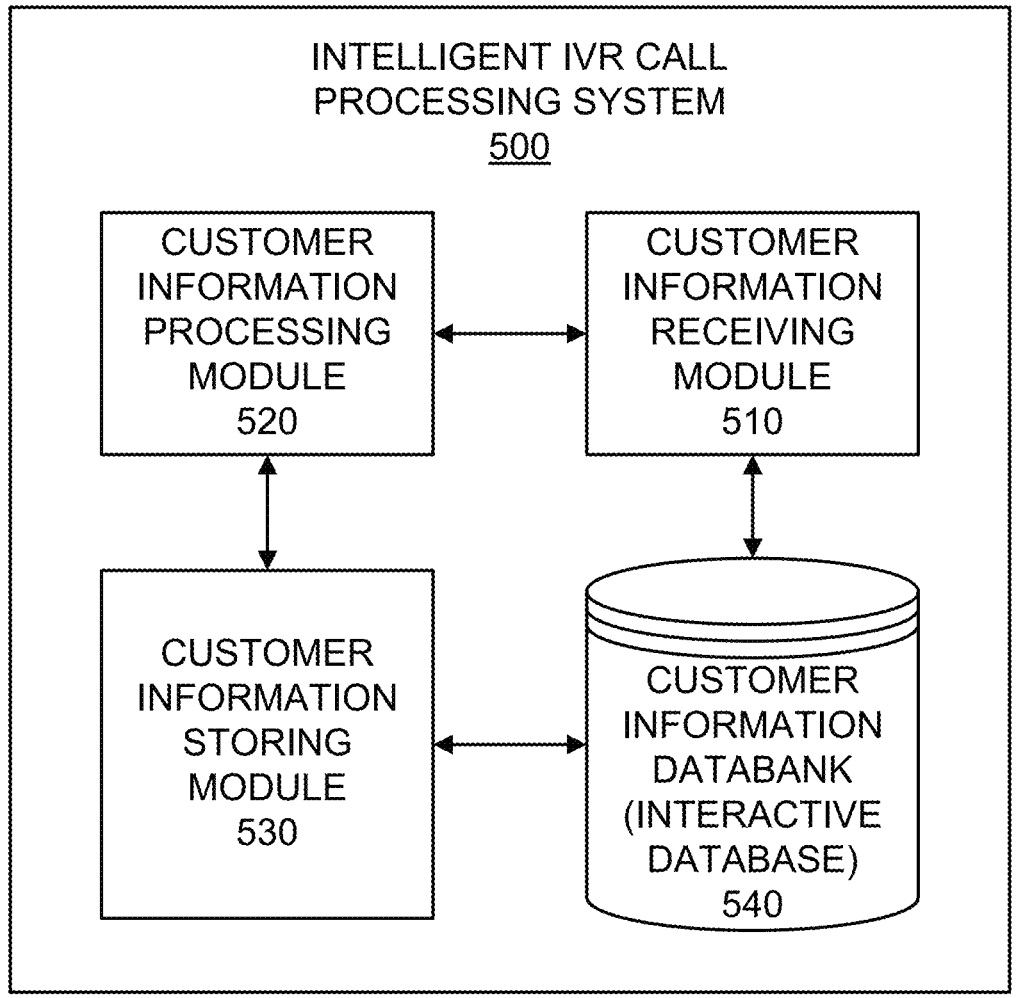
FIG. 5 illustrates an example system configuration of an intelligent IVR call processing system according to example embodiments.

FIG. 5 illustrates an example intelligent interactive voice response (IVR) call processing system 500 according to example embodiments. Referring to FIG. 5, the system 500 includes a customer information receiving module 510, a customer information processing module 520, a customer information storing module 530, and customer information databank or interactive database 540. The system 500 may perform a method of processing a user call via an intelligent voice response (IVR) call processing application.

The call processing application may receive a call from a user device and obtain user information from the received call, such as a user telephone number, user name, voice sample, etc. The obtained information may be received by the receiving module 510 and stored in the customer information databank 540. The customer information processing module 520 may compare the user information to at least one pre-stored user information stored in a user databank associated with a user account, such as an already known user name, telephone number or pre-recorded voice sample. The customer information storing module 530 may calculate a first confidence level by comparing the user information to the pre-stored user information and determine whether to authorize the user device to receive at least one offer based on the first confidence level, and store the obtained confidence level in memory. Various offers may be available and may require a predefined confidence level prior to being offered to the user device. The system 500 may also transmit the offer to the user after being authorized by the first confidence level. Additional offers may be offered to the user device based on the same or higher confidence levels established from communications with the user device.

The user information may include a voice sample, an automatic number identification (ANI) associated with the user device and a user response to a question. In operation, an ANI associated with the user device may be compared to an ANI included in the pre-stored user information stored in the user databank associated with the user account. If the ANI associated with the user device matches the ANI included in the pre-stored user information, then a customized message may be provided to the user device, and the customized message many be based on known user information stored in the user account. If the ANI associated with the user device does not match the ANI included in the pre-stored user information, then a generic message may be provided to the user device that does not include any known user information. Some level of authorization is required before known user information is shared or incorporated with the communications between the call processing application and the user device. Additionally, a second, third, fourth, etc., confidence level may be established that is greater than the first confidence level by comparing additional user information obtained from the user device to the pre-stored user information stored in the user account, and identifying a match between the additional user information and the pre-stored user information. Additional offers, such as upsells, cross-sells, account options, etc., may be presented to the user authorized by the first, second or higher confidence levels that have been authorized.

According to another example operation of the system 500, a method processing multiple user call records via an intelligent voice response (IVR) call processing application may be performed. The system 500 may receive a call from a user device, and obtain first user information from a user account stored in a user databank. The first information may be associated with a first call record established during a first previously received call from the user device. A first confidence level may be based on the first user information. The method may also include obtaining second user information from the user account stored in the user databank, the second user information may be associated with a second call record established during a second previously received call from the user device. There is no limit to the number of call records stored in the user information databank 540 that may be retrieved and used to authorize the user device and establish corresponding confidence levels. For example, a second confidence level may be established based on the second user information obtained from a second call record. As a result, an offer may be transmitted to the user device based on the first confidence level and the second confidence level. For example, the first confidence level and the second confidence level may be combined to establish a combined confidence level, and an offer may be selected for the user device based on the combined confidence level. The combined confidence level may greater than the first confidence level and the second confidence level individually.

Additional confidence levels may be calculated to obtain a maximum confidence level that is a combination of various different user information sources that have been verified to provide a maximum security level. The system 500 may also include enabling the user device to conduct a maximum security transaction during the call based on the established maximum confidence level. For example, a bank account may require a maximum confidence level authorization prior to enabling the user device to wire funds, withdraw money, close an account, etc.

According to another example embodiment, the system 500 may perform a method of extracting and sharing user preference information with other partnered information databanks. The system may receive a call from a user device and retrieve user information from a user account stored in a user databank in response to receiving the call. The system may also transmit a targeted offer to the user device based on the user information retrieved from the user account and receive feedback from the user device regarding the offer. The user device may accept, reject or ask a question regarding the offer. The system may also update the user information in the user account to include the user device feedback and/or determine a next offer to transmit to the user device. A next offer may be transmitted to the user device during the same call or a subsequent call. For example, once it is determined that the user device has accepted an offer or considered an offer, the customer information databank 540 may store the next offer to be offered to the user device with a flag indicating to transfer the next offer to the user device during a subsequent call at a later time.

According to another example operation of the system 500, a data backup operation may be executed to share the user account information with at least one established account partner remotely via a secure communication channel (as indicated in FIG. 3. The data backup operation may include transmitting the user account information to a remote databank of the at least one established account partner over the secure communication channel. The remote databanks may be pre-registered to receive updates when new user information becomes available or periodically according to a predetermined scheduling table. The user device may receive a next offer from the remote databank directly responsive to the transmitted user account information transmitted to the remote databank. In another example, the user information may be updated by retrieving user information from a social networking account associated with the user account. In this example, the user's postings and other shared information may be retrieved and filtered against predefined categories stored in the customer databank 540. By comparing the retrieved user information with predefined categories established in the user account information, a user statement, such as "here is my new house", may be recognized by a bank account filter category for "home loans", "lines of credit", etc., which may trigger additional offers to the user during subsequently received user calls.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example FIG. 6 illustrates an example network element 600, which may represent any of the above-described network components of the other figures.

Figure 6:
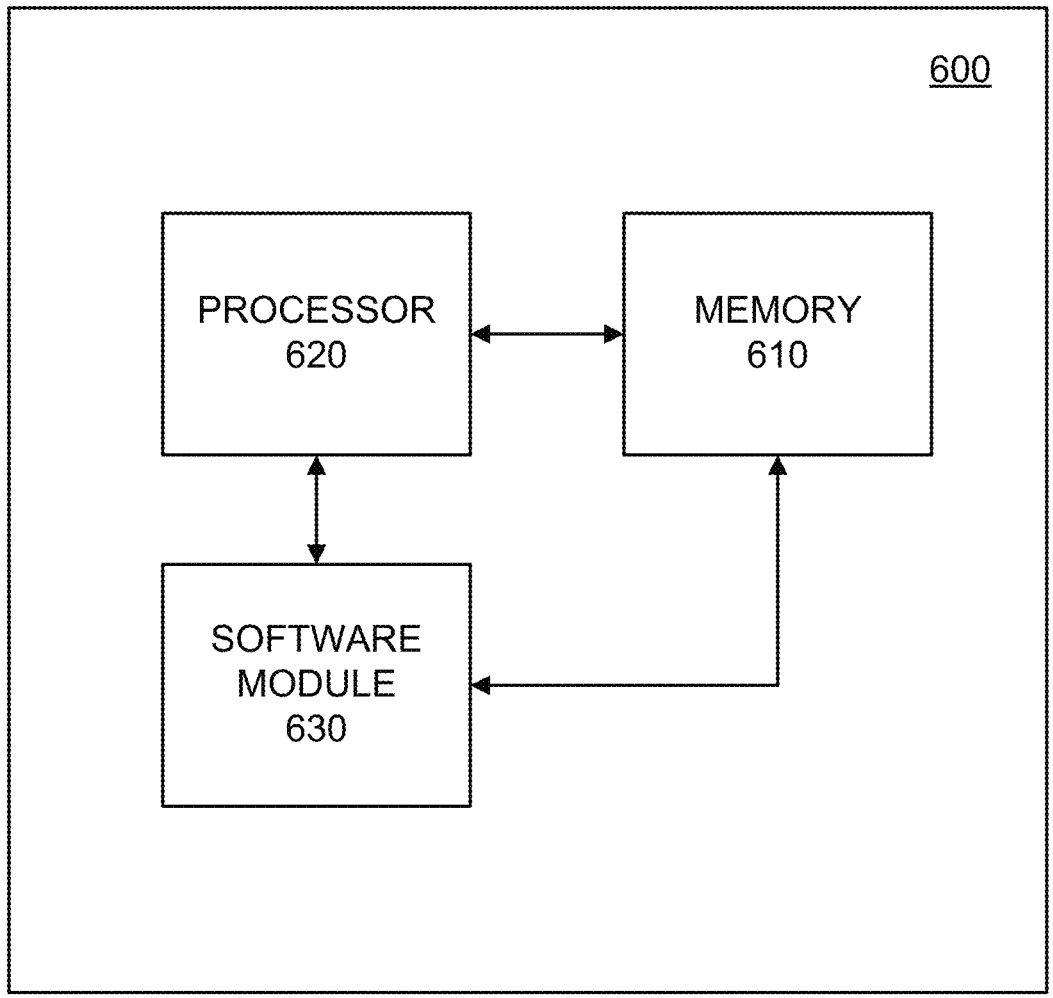
FIG. 6 illustrates a network entity that may include memory, software code and other computer processing hardware used to perform various operations according to example embodiments.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Figure 7A:
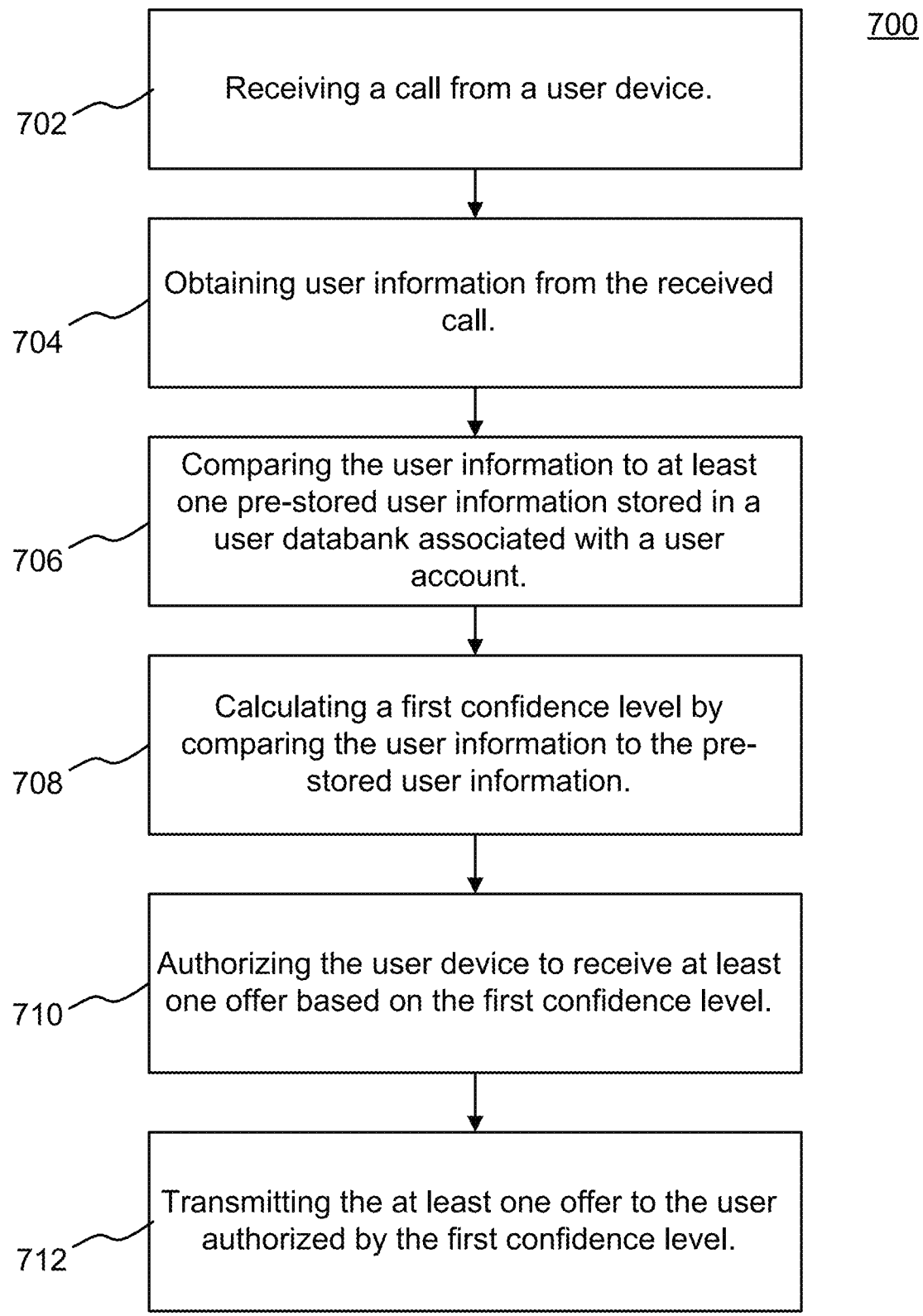
FIG. 7A illustrates an example flow diagram of a method of operation according to example embodiments.

One example method of operation is illustrated in the flow diagram of FIG. 7A. Referring to FIG. 7A, the flow diagram 700 illustrates an example method of processing a user call via an intelligent voice response (IVR) call processing application. The method may include receiving a call from a user device at operation 702, obtaining user information from the received call at operation 704, and comparing the user information to at least one pre-stored user information stored in a user databank associated with a user account at operation 706. The method may further include calculating a first confidence level by comparing the user information to the pre-stored user information at operation 708 and authorizing the user device to receive at least one offer based on the first confidence level at operation 710. The method may also include transmitting the at least one offer to the user authorized by the first confidence level at operation 712.

Figure 7B:
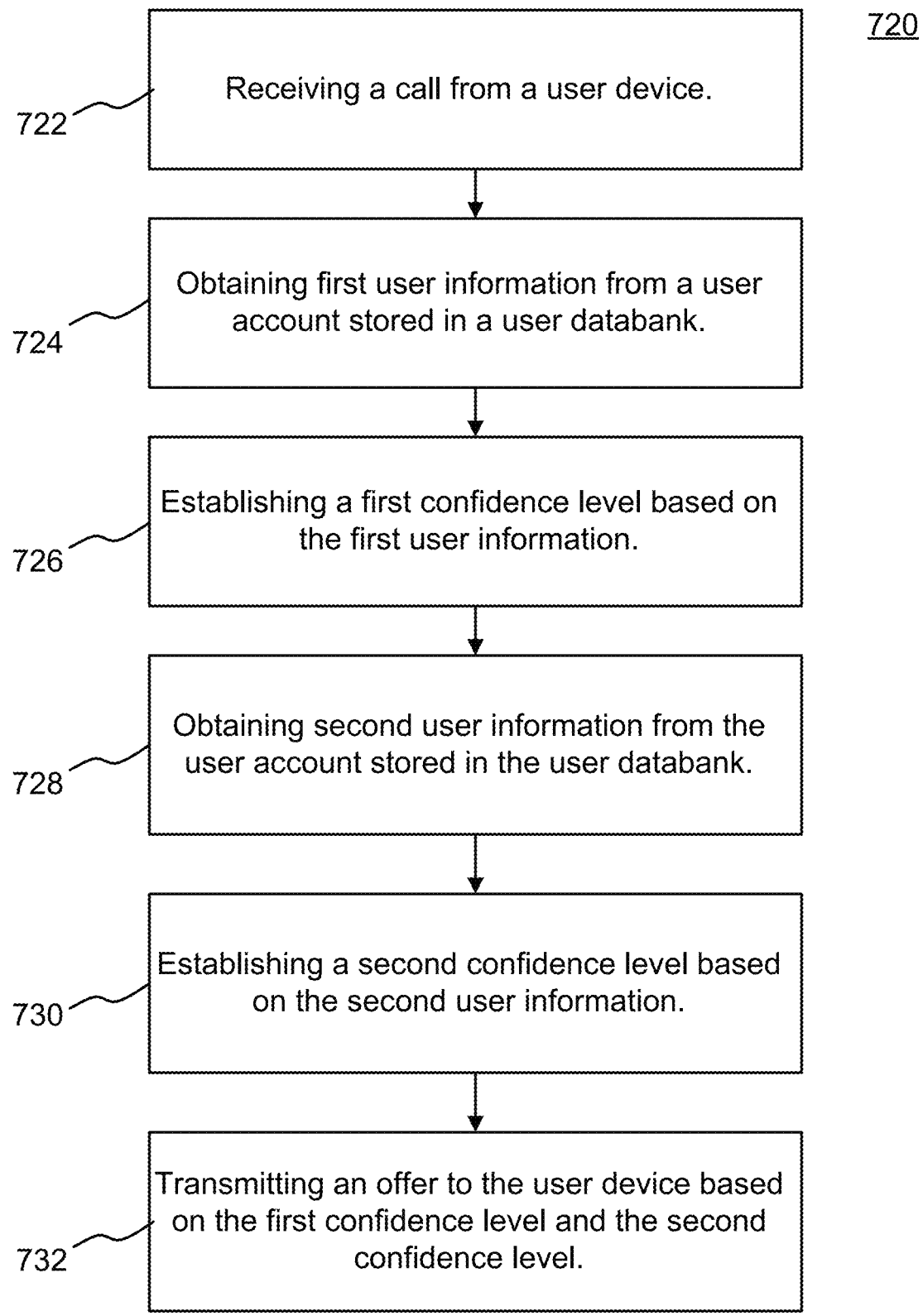
FIG. 7B illustrates another example flow diagram of a method of operation according to example embodiments.

Another example method of operation is illustrated in the flow diagram of FIG. 7B. Referring to FIG. 7B, the flow diagram 720 illustrates an example method of processing multiple user call records via an intelligent voice response (IVR) call processing application. The method may include receiving a call from a user device at operation 722, obtaining first user information from a user account stored in a user databank at operation 724, the first information being associated with a first call record established during a first previously received call from the user device. The method may also include establishing a first confidence level based on the first user information at operation 726 and obtaining second user information from the user account stored in the user databank, the second user information being associated with a second call record established during a second previously received call from the user device at operation 728. The method may also include establishing a second confidence level based on the second user information 730. The method may further include transmitting an offer to the user device based on the first confidence level and the second confidence level at operation 732.

Figure 7C:
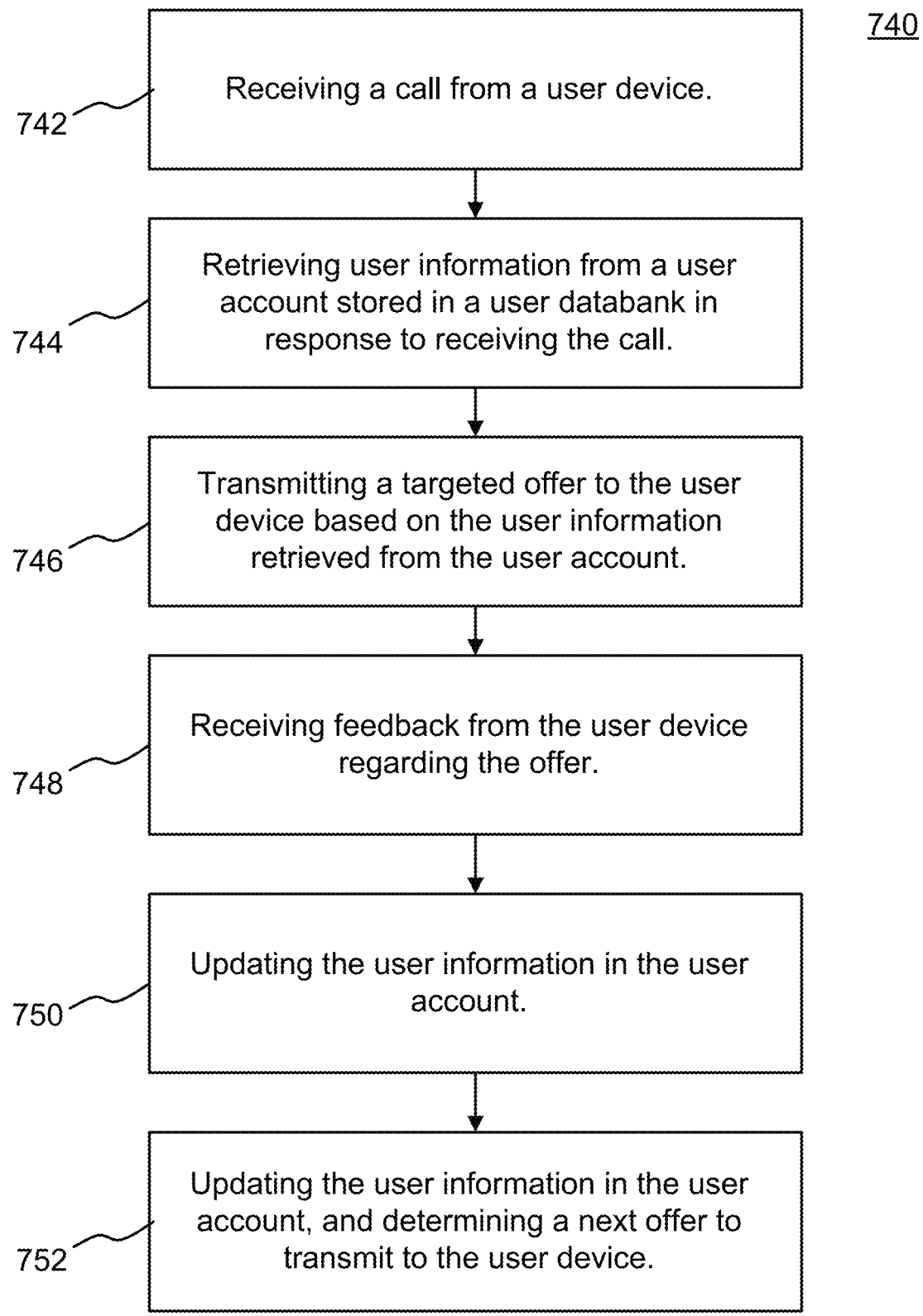
FIG. 7C illustrates yet another example flow diagram of a method of operation according to example embodiments.

Still another example method of operation is illustrated in the flow diagram of FIG. 7C. Referring to FIG. 7C, the flow diagram 740 illustrates an example method of extracting and sharing user preference information. The method may include receiving a call from a user device operation 742, retrieving user information from a user account stored in a user databank in response to receiving the call at operation 744 and transmitting a targeted offer to the user device based on the user information retrieved from the user account at operation 746. The method may also include receiving feedback from the user device regarding the offer at operation 748, updating the user information in the user account at operation 750, and determining a next offer to transmit to the user device at operation 752.

Although an exemplary embodiment of the system, method, and non-transitory computer readable medium of the present application has been illustrated in the accompanied drawings and described in the foregoing detailed description, it will be understood that the present invention is not limited to the embodiments disclosed, but is capable of numerous rearrangements, modifications, and substitutions without departing from the spirit or scope of the invention as set forth and defined by the following claims. For example, the capabilities of the system illustrated in FIG. 4 may be performed by one or more of the modules or components described herein or in a distributed architecture. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

While preferred embodiments of the present invention have been described, it is to be understood that the embodiments described are illustrative only and the scope of the invention is to be defined solely by the appended claims when considered with a full range of equivalents and modifications (e.g., protocols, hardware devices, software platforms etc.) thereto.

What is claimed is:

1. A method, comprising:
obtaining first user information from a user account stored in a user databank, the first information being associated with a first call record established during a first previously received call from a user device;
establishing a first identity confidence level based on the first user information;
obtaining second user information from the user account stored in the user databank, the second user information being associated with a second call record established during a second previously received call from the user device;
establishing a second identity confidence level based on the second user information;
obtaining a maximum identity confidence level based on a combination of the first user information and the second user information;
enabling the user device to conduct a maximum security transaction during a call based on the maximum confidence level; and
transmitting an offer to the user device based on the maximum confidence level.

2. The method of claim 1, further comprising:
combining the first identity confidence level and the second identity confidence level to establish a combined identity confidence level; and
selecting the offer for the user device based on the combined identity confidence level.

3. The method of claim 2, wherein the selected offer is at least one of an upsell and a cross-sell to an existing service provided to the user account.

4. The method of claim 1, wherein the combined identity confidence level is greater than the first identity confidence level and the second identity confidence level.

5. The method of claim 1, further comprising:
authorizing the user device to conduct at least one transaction based on at least one of the first identity confidence level and the second identity confidence level, wherein the at least one transaction comprises a change to the user account.

6. The method of claim 1, further comprising:
obtaining third user information from the user account stored in the user databank, the third user information being associated with a third call record established during a third previously received call from the user device; and verifying the user account based on the maximum confidence level that is a combination of the first user information, the second user information and the third user information.

7. An apparatus, comprising:

a processor to:
- obtain first user information from a user account stored in a user databank, the first information being associated with a first call record established during a first previously received call from a user device;
- establish a first identity confidence level based on the first user information;
- obtain second user information from the user account stored in the user databank, the second user information being associated with a second call record established during a second previously received call from the user device;
- establish a second identity confidence level based on the second user information;
- obtain a maximum identity confidence level based on a combination of the first user information and the second user information;
- enable the user device to conduct a maximum security transaction during a call based on the maximum confidence level; and
- cause a transmitter to send an offer to the user device based on the maximum confidence level.

8. The apparatus of claim 7, wherein the processor further is to:
- combine the first identity confidence level and the second identity confidence level to establish a combined identity confidence level, and
- select the offer for the user device based on the combined identity confidence level.

9. The apparatus of claim 8, wherein the selected offer is at least one of an upsell and a cross-sell to an existing service provided to the user account.

10. The apparatus of claim 7, wherein the combined identity confidence level is greater than the first identity confidence level and the second identity confidence level.

11. The apparatus of claim 7, wherein the processor is to:
- authorize the user device to conduct at least one transaction based on at least one of the first identity confidence level and the second identity confidence level, wherein the at least one transaction comprises a change to the user account.

12. The apparatus of claim 7, wherein the processor is to:
obtain third user information from the user account stored in the user databank, the third user information being associated with a third call record established during a third previously received call from the user device; and verify the user account based on the maximum confidence level that is a combination of the first user information, the second user information and the third user information.

13. A non-transitory computer readable storage medium to store instructions that when executed by a processor cause the processor to perform:
- obtaining first user information from a user account stored in a user databank, the first information being associated with a first call record established during a first previously received call from a user device;
- establishing a first identity confidence level based on the first user information;
- obtaining second user information from the user account stored in the user databank, the second user information being associated with a second call record established during a second previously received call from the user device;
- establishing a second identity confidence level based on the second user information;
- obtaining a maximum identity confidence level based on a combination of the first user information and the second user information;
- enabling the user device to conduct a maximum security transaction during a call based on the maximum confidence level; and
- transmitting an offer to the user device based on the maximum confidence level.

14. The non-transitory computer readable storage medium of claim 13, wherein the instructions are further configured to cause the processor to perform:
- combining the first identity confidence level and the second identity confidence level to establish a combined identity confidence level; and
- selecting the offer for the user device based on the combined identity confidence level.

15. The non-transitory computer readable storage medium of claim 14, wherein the selected offer is at least one of an upsell and a cross-sell to an existing service provided to the user account.

16. The non-transitory computer readable storage medium of claim 13, wherein the combined confidence level is greater than the first identity confidence level and the second identity confidence level.

17. The non-transitory computer readable storage medium of claim 13, wherein the instructions are further configured to cause the processor to perform:
- authorizing the user device to conduct at least one transaction based on at least one of the first identity confidence level and the second identity confidence level, and wherein the at least one transaction comprises a change to the user account.

* * * * *